(12) United States Patent
Tervonen et al.

(10) Patent No.: US 7,756,101 B2
(45) Date of Patent: Jul. 13, 2010

(54) EFFICIENT RESOLUTION OF RELINQUISHMENT REQUESTS IN A WIRELESS COMMUNICATIONS NETWORK

(75) Inventors: Janne Tervonen, Espoo (FI); Janne Marin, Espoo (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 589 days.

(21) Appl. No.: 11/322,124

(22) Filed: Dec. 30, 2005

(65) Prior Publication Data

US 2007/0153717 A1    Jul. 5, 2007

(51) Int. Cl.
  *H04B 7/212*    (2006.01)
  *H04B 5/00*    (2006.01)
  *H04B 7/00*    (2006.01)
  *H04W 4/00*    (2009.01)

(52) U.S. Cl. ............... 370/348; 370/347; 370/338; 455/41.1; 455/41.2; 455/41.3

(58) Field of Classification Search .............. 370/348, 370/347, 338, 310; 455/454, 509, 507, 41.1, 455/41.2, 41.3
See application file for complete search history.

(56) References Cited

U.S. PATENT DOCUMENTS

| | | | | |
|---|---|---|---|---|
| 5,719,942 | A * | 2/1998 | Aldred et al. | 709/228 |
| 6,496,490 | B1 * | 12/2002 | Andrews et al. | 370/329 |
| 6,618,776 | B1 * | 9/2003 | Zimmermann et al. | 710/117 |
| 7,170,943 | B1 * | 1/2007 | Van Heeswyk et al. | 375/259 |
| 7,636,343 | B2 * | 12/2009 | Mizukoshi | 370/338 |
| 2001/0036810 | A1 * | 11/2001 | Larsen | 455/11.1 |
| 2002/0044549 | A1 * | 4/2002 | Johansson et al. | 370/386 |
| 2004/0116140 | A1 * | 6/2004 | Babbar et al. | 455/517 |

(Continued)

OTHER PUBLICATIONS

Yin et al. "Third-Party Handshake Protocol for Efficient Peer Discovery in IEEE 802.15.3 WPANs" Oct. 3-7, 2005, IEEE Broadband Networks, 2005 2nd International Conference on, pp. 840- 849 vol. 2.*

(Continued)

*Primary Examiner*—Rafael Pérez-Gutiérrez
*Assistant Examiner*—Allahyar Kasraian
(74) *Attorney, Agent, or Firm*—Locke Lord Bissell & Liddell

(57) ABSTRACT

A first device receives a request from a remote device to relinquish at least a portion of an existing reservation in a wireless communications network (e.g., a WiMedia network). The existing reservation is between the first device and a second device. Also, the existing reservation was initiated by the second device and includes a first allocation of resources of the wireless communications network. The first device forwards the request from the first device to the second device, and sends to the second device information indicating a current view of resource utilization in the wireless communications network. This view is from a perspective of the first device. Also, first device may receive a request from the second device for a second allocation of resources of the wireless communications network between the first device and the second device. Such a request may be based on the resource utilization information provided by the first device. Further, the first device may also send, to the second device, an acceptance of the request for the second allocation of resources. Based on this acceptance, the first and second device may communicate according to the second allocation of resources.

27 Claims, 12 Drawing Sheets

U.S. PATENT DOCUMENTS

| | | | |
|---|---|---|---|
| 2004/0156329 A1* | 8/2004 | Bck et al. | 370/328 |
| 2004/0158644 A1* | 8/2004 | Albuquerque et al. | 709/238 |
| 2005/0009524 A1* | 1/2005 | Garani et al. | 455/445 |
| 2005/0169222 A1* | 8/2005 | Ayyagari et al. | 370/338 |
| 2005/0208928 A1* | 9/2005 | Avery et al. | 455/412.2 |
| 2006/0040701 A1* | 2/2006 | Long et al. | 455/525 |
| 2006/0092899 A1* | 5/2006 | Hong et al. | 370/338 |
| 2006/0198353 A1* | 9/2006 | Wason et al. | 370/347 |
| 2006/0268891 A1* | 11/2006 | Heidari-Bateni et al. | 370/395.4 |
| 2007/0002821 A1* | 1/2007 | Carlson et al. | 370/349 |
| 2007/0073935 A1* | 3/2007 | Kim et al. | 710/62 |
| 2007/0104215 A1* | 5/2007 | Wang et al. | 370/458 |
| 2007/0263582 A1* | 11/2007 | Yuasa | 370/338 |
| 2008/0043634 A1* | 2/2008 | Wang et al. | 370/252 |
| 2008/0144597 A1* | 6/2008 | Chen | 370/345 |
| 2008/0165727 A1* | 7/2008 | Xiaoben et al. | 370/329 |
| 2008/0247366 A1* | 10/2008 | Celentano et al. | 370/338 |
| 2008/0268855 A1* | 10/2008 | Hanuni et al. | 455/445 |
| 2009/0080456 A1* | 3/2009 | Hillyard et al. | 370/450 |
| 2009/0106810 A1* | 4/2009 | Stoye et al. | 725/131 |
| 2009/0213816 A1* | 8/2009 | Guo et al. | 370/336 |
| 2009/0323697 A1* | 12/2009 | Celentano et al. | 370/395.42 |

OTHER PUBLICATIONS

Chou et al., "Mobility Support Enhancements for the WiMedia UWB MAC Protocol", Oct. 3-7, 2005, IEEE: Broadband Networks, vol. 3.*

O'Conor, Jay; Brown, Ron (ed.), *Distributed Medium Access Control (MAC) for Wireless Networks*, WiMedia Technical Specification, Draft 0.98, Aug. 6, 2005.

* cited by examiner

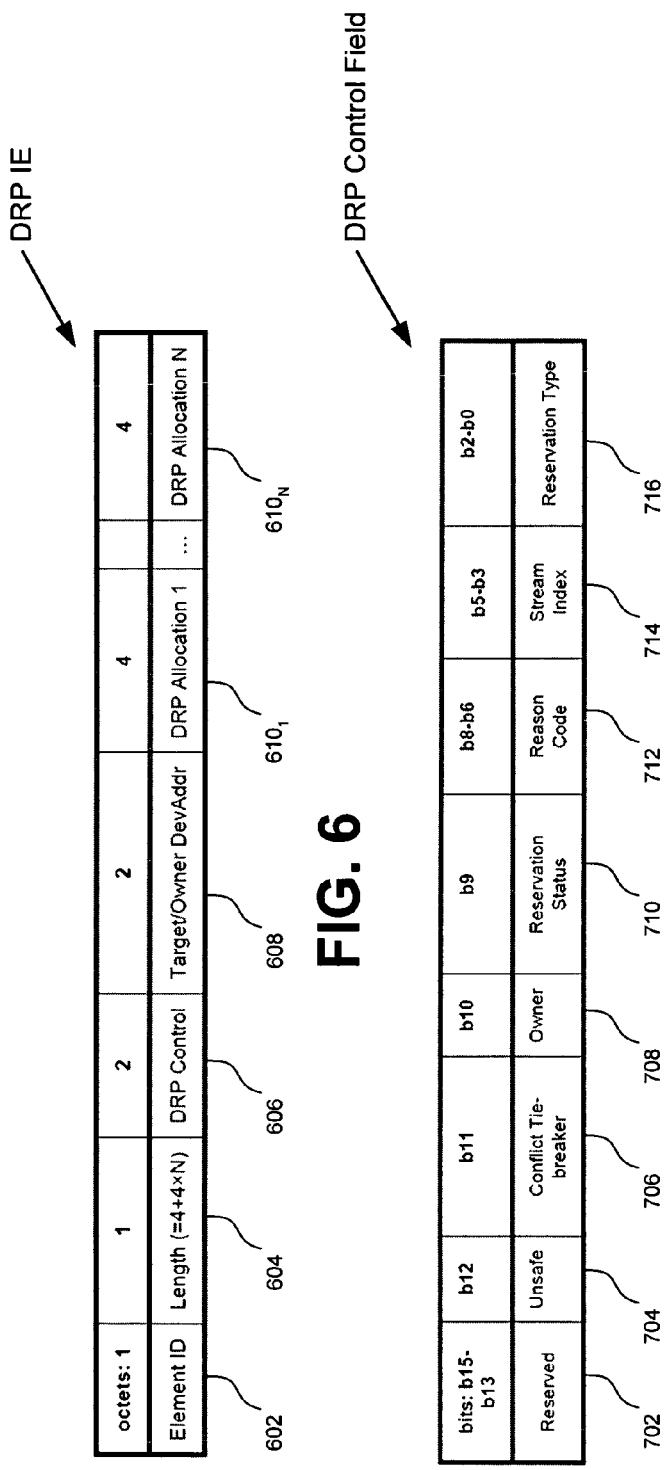
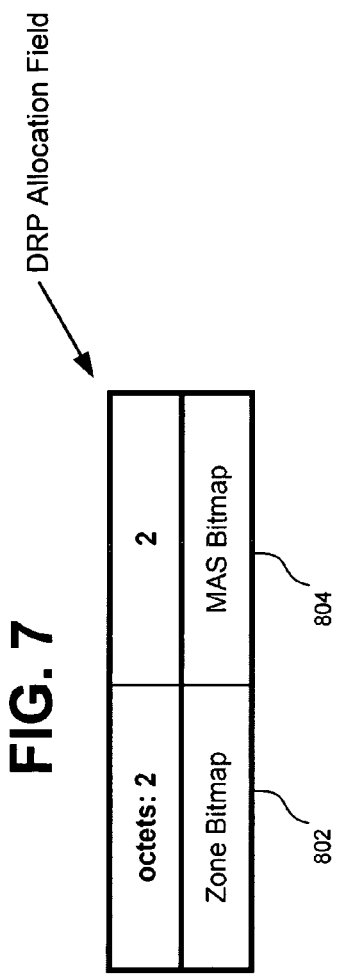
FIG. 6
FIG. 7
FIG. 8

EFFICIENT RESOLUTION OF RELINQUISHMENT REQUESTS IN A WIRELESS COMMUNICATIONS NETWORK

FIELD OF THE INVENTION

The present invention relates to wireless communications. More particularly, the present invention relates to techniques for sharing wireless communications media in wireless network environments.

BACKGROUND OF THE INVENTION

Short-range wireless proximity networks typically involve devices that have a communications range of one hundred meters or less. To provide communications over long distances, these proximity networks often interface with other networks. For example, short-range networks may interface with cellular networks, wireline telecommunications networks, and the Internet.

High rate physical layer (PHY) techniques for short-range proximity networks are quickly emerging. One such technique involves frequency hopping applications of orthogonal frequency division multiplexing (OFDM). This technique involves the transmission of each of the OFDM symbols at various frequencies according to pre-defined codes, such as Time Frequency Codes (TFCs). Time Frequency Codes can be used to spread interleaved information bits across a larger frequency band.

The WiMedia Medium Access Control (MAC) group is developing a MAC layer that would be used with an OFDM physical layer. A current version of this MAC is described by O'Conor, Jay; Brown, Ron (ed.), *Distributed Medium Access Control (MAC) for Wireless Networks, WiMedia Technical Specification, Draft* 0.98, Aug. 6, 2005 (also referred to herein as the WiMedia MAC Specification v. 0.98).

This MAC layer involves a group of wireless communications devices (referred to as a beaconing group) that are capable of communicating with each other. The timing of beaconing groups is based on a repeating pattern of "superframes" in which the devices may be allocated communications resources.

MAC layers govern the exchange among devices of transmissions called frames. A MAC frame may have various portions. Examples of such portions include frame headers and frame bodies. A frame body includes a payload containing data associated with higher protocol layers, such as user applications. Examples of such user applications include web browsers, e-mail applications, messaging applications, and the like.

In addition, MAC layers govern the allocation of resources. For instance, each device requires an allocated portion of the available communication bandwidth to transmit frames. The WiMedia MAC provides for the allocation of resources to be performed through communications referred to as beacons. Beacons are transmissions that devices use to convey non-payload information. Each device in a beaconing group is assigned a portion of bandwidth to transmit beacons.

Such transmissions allow the WiMedia MAC to operate according to a distributed control approach, in which multiple devices share MAC layer responsibilities. Accordingly, the WiMedia MAC Specification v. 0.98 provides various channel access mechanisms that allow devices to allocate portions of the transmission medium for communications traffic. These mechanisms include a protocol called the distributed reservation protocol (DRP) in which reservations for connections are negotiated among devices. These mechanisms also include a protocol called prioritized contention access (PCA).

As the use of communications networks, such as short-range wireless proximity networks, becomes progressively more prevalent, it is desirable to increase network capacity. Also, it is desirable to accelerate allocation processes for sharing the wireless communications medium, such as DRP mechanisms. Accordingly, techniques are needed to provide such features.

SUMMARY OF THE INVENTION

Embodiments of the present invention provide for the efficient handling of resources in communications networks, such as WiMedia networks. For instance, a method of the present invention receives (at a first device) a request from a remote device to relinquish at least a portion of an existing reservation in a wireless communications network. The existing reservation is between the first device and a second device. Also, the existing reservation was initiated by the second device and includes a first allocation of resources of the wireless communications network. The method also forwards the request from the first device to the second device, and sends (from the first device to the second device) information indicating a current view of resource utilization in the wireless communications network from a perspective of the first device. In embodiments, the remote device and the second device are unable to communicate directly with each other.

The method may also include further aspects. For instance, the method may receive (at the first device) a request from the second device for a second allocation of resources of the wireless communications network between the first device and the second device. Such a request may be based on the resource utilization information provided by the first device. Further, the method may also send (from the first device to the second device) an acceptance of the request for the second allocation of resources. Based on this acceptance, the first and second device may communicate according to the second allocation of resources.

As discussed above, the wireless communications network may be a WiMedia network, and the reservation between the first and second devices is a Distributed Reservation Protocol (DRP) reservation. Also, the resources of the wireless communications network may be time slots occurring in a repeating time interval, such as a WiMedia Superframe.

This method may be performed in various situations, one situation involves the first device having an allocation of resources that exceeds one or more predetermined limits for the wireless communications network. These one or more limits may include a total allocation of resources limit, a total consecutive time slot allocation limit for the reservation, and/or other limits.

An apparatus of the present invention includes a transceiver for communicating with devices across a wireless communications network, a memory, and a processor that executes instructions stored in the memory. These instructions may be for performing combinations of the above features.

In addition, a computer program product of the present invention includes a computer useable medium having computer program logic recorded thereon for enabling a processor in a communications device. This computer program logic includes program code for performing combinations of the above features.

Embodiments of the present invention provide efficient and streamlined allocation operations in communications networks. Further features and advantages of the present invention will become apparent from the following description and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 6-12 are diagrams involving the format of various Information Elements;

DETAILED DESCRIPTION OF THE PREFERRED EMBODIMENTS

I. Operational Environment

Figure 1:
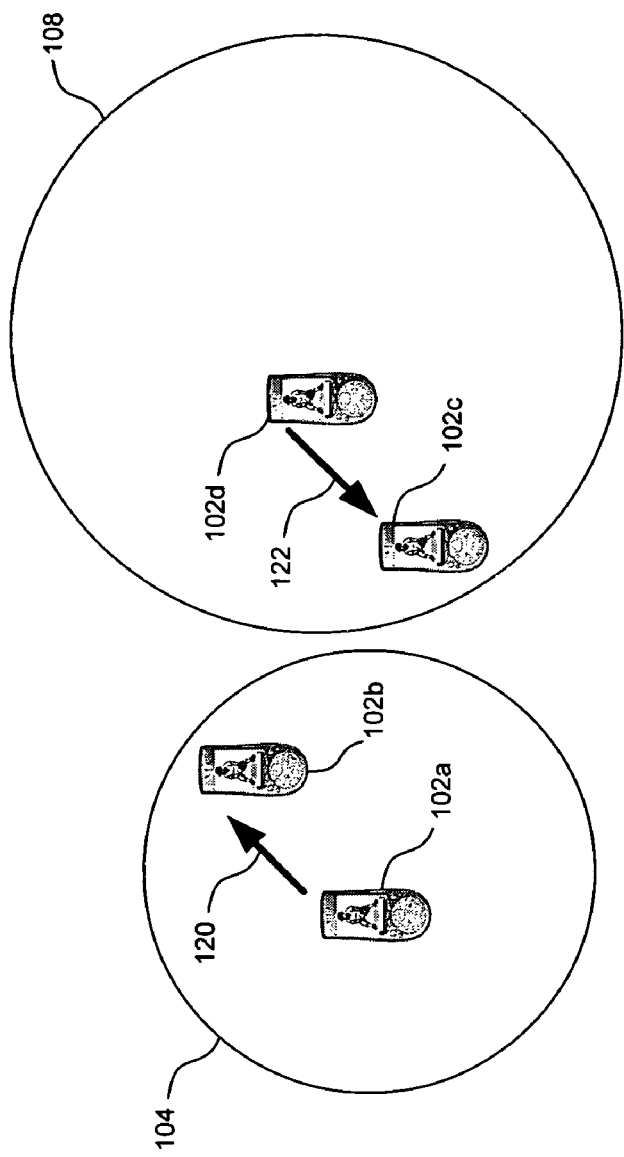
FIG. 1 is a diagram of an exemplary operational environment.

FIG. 1 is a diagram of a communications environment in which the techniques of the present invention may be employed. This environment includes multiple communications devices (DEVs) 102 that exchange wireless transmissions. In particular, FIG. 1 shows a device 102a sending a wireless transmission 120 to a device 102b. Also, FIG. 1 shows a device 102d sending a wireless transmission 122 to a device 102c.

For each of these transmitting devices, communicating ranges are shown. For instance, a communicating range 104 is shown for device 102a. Likewise, a communicating range 108 is shown for device 102d. These are exemplary ranges shown for the purposes of illustration. In fact, the actual communicating range for each device will depend upon the employed transmission power (as well as other environmental factors). More particularly, the greater the transmit power, the larger the communicating range.

The communicating ranges illustrated in FIG. 1 may correspond to certain operational settings established by the network. For instance, the ranges may individually correspond to a maximum transmit power setting or a lower (energy saving) power setting. However, in embodiments, certain transmissions may be required to be sent at the maximum transmit power setting. An example of such transmissions includes WiMedia beacons.

As shown in FIG. 1, communicating range 104 covers the intended recipient of transmission 120 (device 102b), but not the intended recipient of transmission 122 (device 102c). Similarly, communicating range 108 covers the intended recipient of transmissions 122 (device 102c), but not the intended recipient of transmission 120 (device 102b). This characteristic has its benefits. For instance, these ranges may help to reduce interference at devices 102b and 102c. However, these ranges may also have their drawbacks. For instance, device 102d cannot directly communicate (i.e., in a single hop) with device 102b.

II. Superframe

Figure 2A:
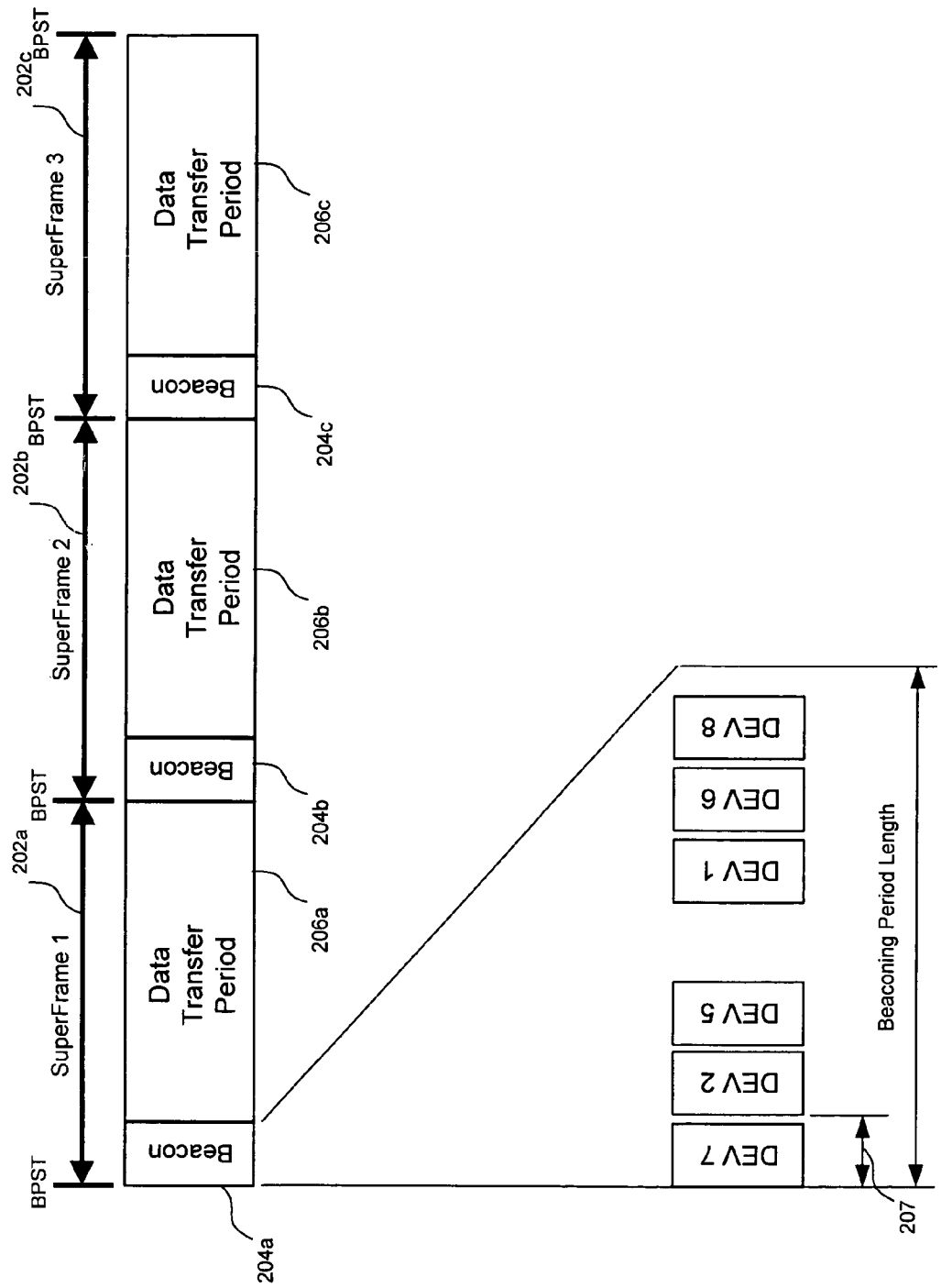
FIGS. 2A and 2B are diagrams of superframe formats employed in shared transmission media.

Wireless network transmissions in the environment of FIG. 1 may be based on a repeating time pattern, such as a superframe. An exemplary superframe format is shown in FIG. 2A. In particular, FIG. 2A shows a frame format having superframes 202a, 202b, and 202c.

Each superframe 202 includes a beacon period 204 and a data transfer period 206. Beacon periods 204 convey transmissions from each of the active devices in the beaconing group. Accordingly, each beacon period 204 includes multiple beacon slots 207. Slots 207 each correspond to a particular device in the network. The devices employing beacon slots 207 are referred to as a beaconing group. During these slots, the corresponding device may transmit various overhead or networking information. For WiMedia networks, such information may be in predetermined forms called Information Elements (IEs).

For instance, such information may be used to set resource allocations and to communicate management information for the beaconing group. In addition, according to the present invention, data transfer periods 206 may be used to transmit information regarding services and features (e.g., information services, applications, games, topologies, rates, security features, etc.) of devices within the beaconing group. The transmission of such information in beacon periods 204 may be in response to requests from other devices.

Data transfer period 206 is used for devices to communicate data according to various transmission schemes. These schemes may include, for example, frequency hopping techniques that employ OFDM and/or time frequency codes (TFCs). For instance, data transfer periods 206 may support data communications across links 120 and 122. In addition, devices (e.g., DEVs 102a-d) may use data transfer periods 206 to transmit control information, such as request messages to other devices. To facilitate the transmission of traffic, each device may be allocated one or more particular time slots within each data transfer period 206. In the context of the WiMedia MAC, these time slots are referred to as media access slots (MASs).

A MAS is a period of time within data transfer period 206 in which two or more devices can exchange data (i.e., communicate). According to the WiMedia MAC, MASs may be allocated by a distributed protocol, called the distributed reservation protocol (DRP). DRP protects the MASs from contention access by devices acknowledging the reservation. Alternatively, the WiMedia MAC provides for resource allocation according to a prioritized contention access (PCA) protocol. Unlike DRP, PCA isn't constrained to reserving one or more entire MASs. Instead, PCA can be used to allocate any part of the superframe that is not reserved for beaconing or DRP reservations.

Figure 2B:
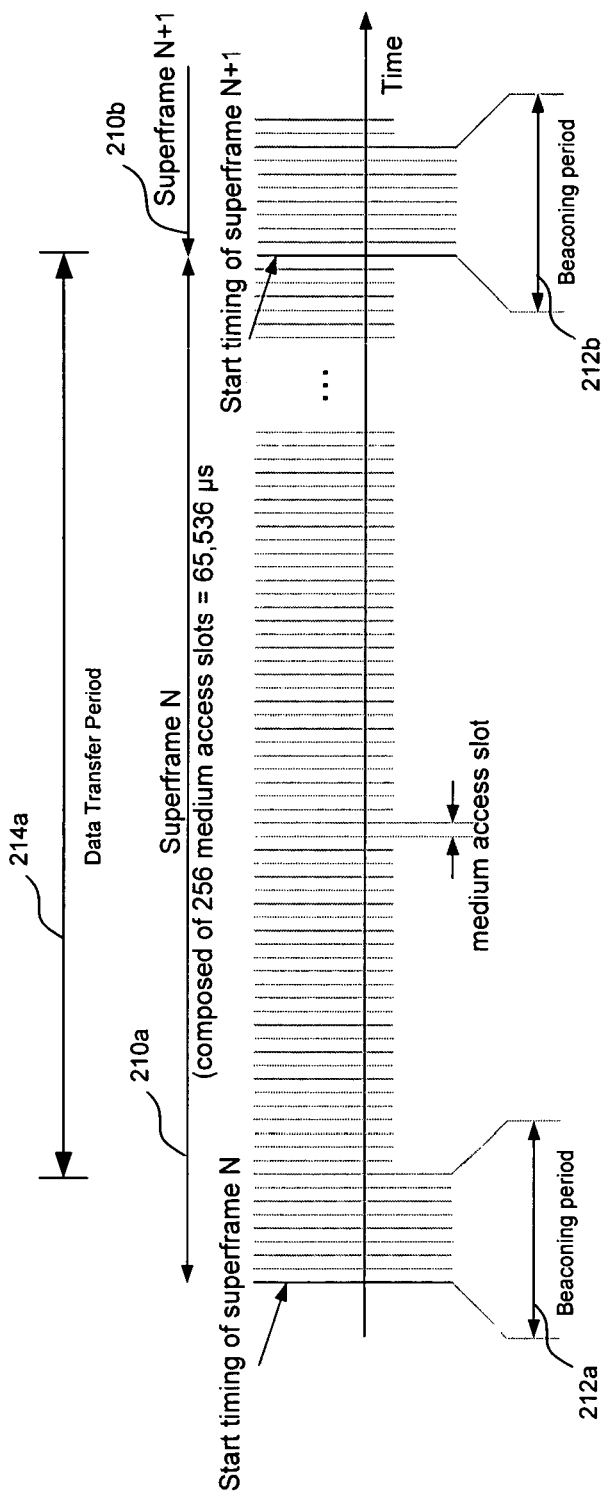

FIG. 2B is a diagram of a frame format designated by the WiMedia MAC Specification v. 0.98. Like the frame format of FIG. 2A, the WiMedia frame format has successive superframes 210. As shown in FIG. 2B, the current WiMedia superframe includes 256 MASs and has duration of 65,536 microseconds. Within each WiMedia superframe 210, a first set of MAS(s) is designated as a beaconing period 212. The number of MASs in this period is flexible, so it may dynamically change. The remaining portion of the (i.e., non-beaconing period portion) of WiMedia superframe 210 is designated as a data transfer period 214.

III. Reservation Establishment

Figure 3:
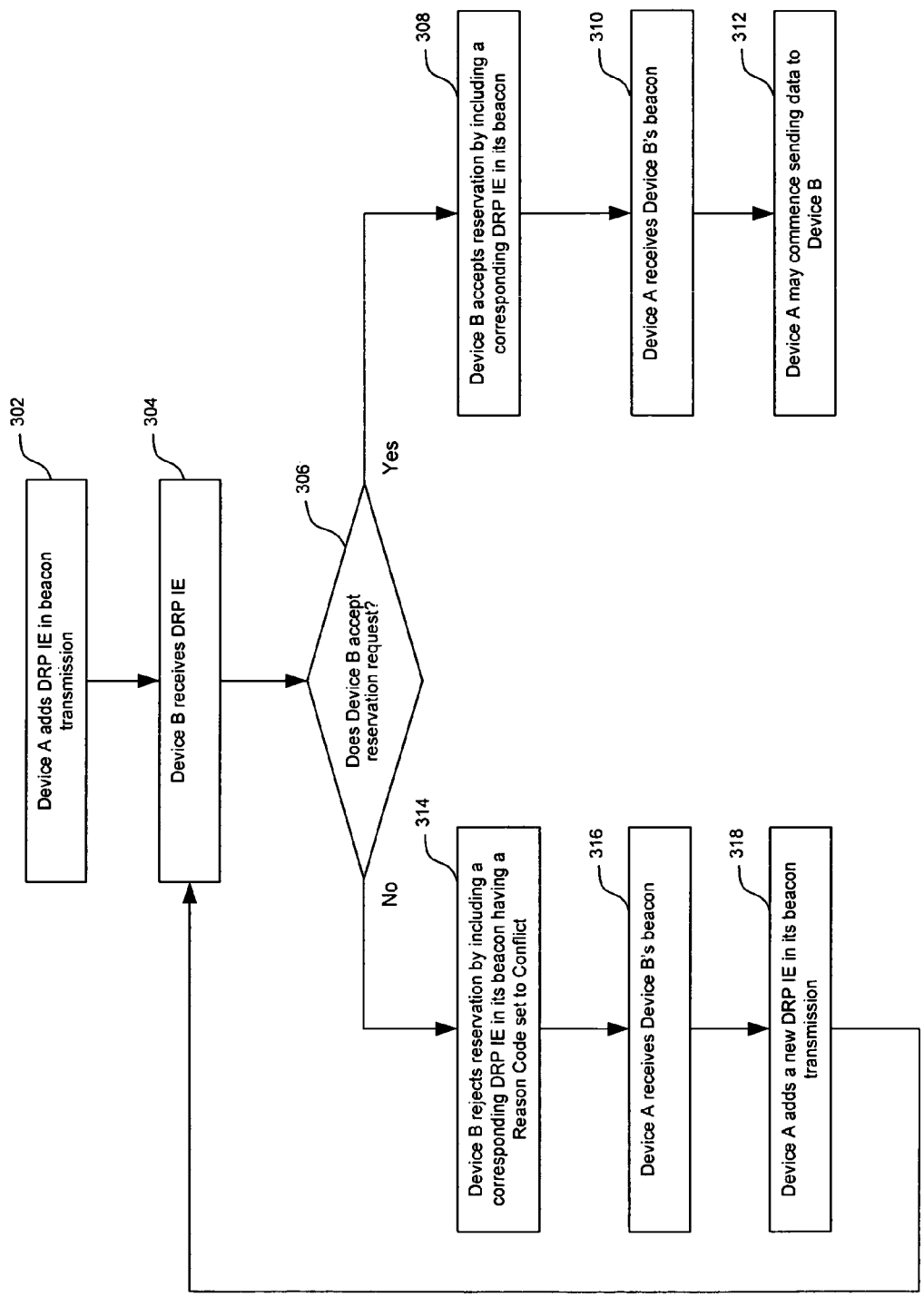
FIG. 3 is a flowchart of a distributed reservation protocol (DRP) reservation establishment process.

FIG. 3 is a flowchart of a DRP reservation establishment process between a device A and a device B. In this process device A initiates the process. Accordingly device A can also be called the "owner" and device B can also be called the "target" of the reservation.

This establishment process includes a step 302, in which device A initiates the DRP reservation establishment process by adding a new DRP IE in its beacon transmission during a first superframe. The DRP IE, which is received by device B in a step 304, indicates a DRP reservation request.

In a step 306, device B determines whether it will accept this reservation request. If so, then device B performs a step 308. Otherwise operation proceeds to a step 314. In step 308, device B responds to the request by including a corresponding DRP IE in its beacon that it transmits in a subsequent superframe.

In a step 310, device A receives the corresponding DRP IE sent by device B. Following this, device A may commence sending data on the presently established DRP reservation in a step 312.

As described above, step 314 is performed when device B determines that it will not accept device A's reservation request. FIG. 3 shows that in step 314, device B responds to the request by including a DRP IE in its beacon that it transmits in a subsequent superframe. However, this DRP IE includes a Reason Code field with its value set to Conflict. According to an alternative scenario, the Reason Code field might also be set to Denied.

In a step 316, device A receives the DRP IE sent by device B in step 314. Following this, device A may transmit a new DRP IE in a step 318. This new DRP IE specifies MAS(s) that do not conflict with other reservations.

FIG. 3 shows that, after step 318, operation returns to step 304 in which device A receives the new DRP IE. Following this, device B determines in step 306 whether it will accept the reservation request according to the new DRP IE.

Although the above description involves the establishment of a new DRP reservation, the process of FIG. 3 also may apply to the modification of an existing DRP reservation.

According to the process of FIG. 3, three superframes (at best) are required until transmission of data may occur on a previously un-established DRP reservation. However, if device A needs to transmit a new DRP IE (e.g., in step 318), this process requires at least five superframes. Still, this process may often require even more superframes because of the nature of its mobile wireless environment. For instance, beacon transmissions may be lost in this environment. Also, device B may not accept device A's reservation request due to, for example, conflicting reservations or other reasons.

IV. Reservation Limits

Certain reservation limits for devices may be imposed by wireless communications environments. For example, the WiMedia MAC Specification v. 0.98 currently defines a reservation policy for reserving radio resources among devices in a controlled manner. According to this policy, there is a reservation limit for the number of reserved MASs (specified as 105 MASs in the WiMedia MAC Specification v. 0.98) that the device should not exceed.

The WiMedia MAC specification v. 0.98 also specifies another limit regarding the number of reserved MASs a device may have. This limit involves the number of consecutive MAS a device has reserved. In particular, the number of consecutive reserved MASs shall not exceed a certain number. This number, which varies between 8 and 1 MAS(s) in this specification, is based on the position of the reservation within the superframe. More specifically, the closer the reservation is to the start of a zone, the bigger the limit.

Appendix B of the WiMedia MAC Specification v. 0.98 defines this variation according to a so called "Y-rule". The Y-rule is defined by the following formula:

$$Y = \text{floor}[(17-X)/2]$$

In this formula, X represents the MAS number (counting from zero) within the zone of the earliest reserved MAS within the set of consecutive MASs. Thus, according to the WiMedia MAC Specification v. 0.98, in order for a reservation to be "safe", it shall not exceed either of the total MAS limit rule (e.g., 105 MASs) and the consecutive MAS limit rule (e.g., the "Y-rule").

Such limits are directed at purposes, such as ensuring fairness between devices within the same beacon group. However, if a device decides to exceed the specified reservation limit, the device is required to mark the reservation(s) exceeding the limit as "unsafe".

Such unsafe reservation(s) can be relinquished based on requests from other devices. For example, in the WiMedia MAC, this is done by adding a Relinquish Request IE in the beacon of the requesting device. The device that receives the Relinquish Request IE for its "unsafe" reservation(s) shall either release the requested MASs or modify its reservation(s) so that it does not anymore exceed any specified reservation limit(s) (thus making the reservation "safe"). When modifying an existing DRP reservation, a general rule is that owner of the reservation (and not the target) shall be in control and make decisions about the changes related to the reservation.

V. Operational Scenario

Figure 4:
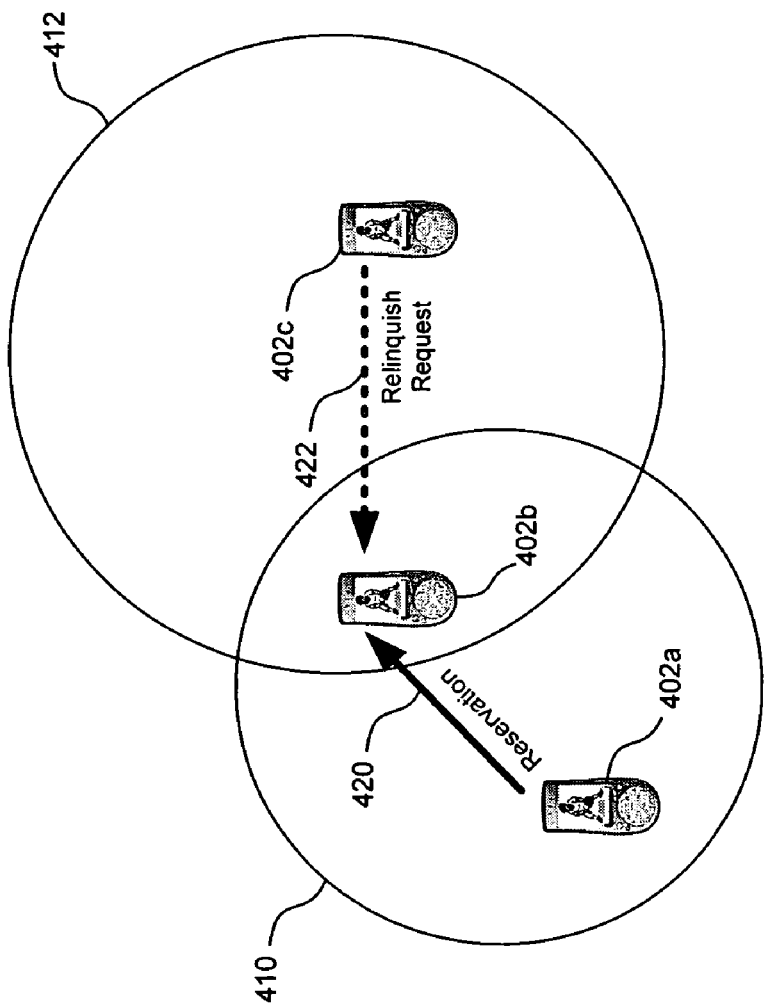
FIG. 4 is a diagram of an operational scenario, according to embodiments of the present invention.

FIG. 4 is diagram of an operational scenario involving multiple wireless communications devices. In particular, this scenario involves a device 402a, a device 402b, and a device 402c. As shown in FIG. 4, devices 402a and 402b are in communicating range of each other (shown as range 410). Also, devices 402b and 402c are in communicating range of each other (shown as range 412). However, devices 402c and 402a are not within communicating range.

In this scenario, device 402a has established a DRP reservation 420 with device 402b. Thus, for reservation 420, device 402a is the owner and device 402b the target. Moreover, device 402b has set reservation 420 as unsafe because it has exceeded one or more reservation limit(s) (such as the total reservation and/or consecutive MAS limits described above). For instance, device 402b may have exceeded this limit due to reservations it has with other devices (not shown). Subsequently, device 402c requires the unsafe reservation (partly or as a whole) and sends the Relinquish Request IE to the device 402b. The resource request presented in Relinquish Request IE should be resolved as fast as possible. Currently, the WiMedia MAC specification sets a time limit of four superframes. Within this time limit, the requested resources should be either released or changed to be "safe" (i.e. protected from the relinquish requests).

A description of the current relinquishment procedure is now provided. As described above, device 402c sends a Relinquish Request IE 422 to device 402*b*. In a first superframe, device 402*b* receives Relinquish Request IE 422. Now, as indicated above, device 402*b* has four superframes to either remove the requested MASs or to modify its reservation so that the MAS(s) indicated in Relinquish Request IE 422 are no longer unsafe. In other words, by the sixth superframe, it is required that Relinquish Request IE 422 be resolved.

Device 402*b* cannot itself modify DRP reservation 420 because is the target device. Therefore, device 402*b* forwards/reflects Relinquish Request IE 422 to device 402*a* (the owner of DRP reservation 420). This forwarding/reflecting occurs on the second superframe.

When device 402*a* receives forwarded Relinquish Request IE 422 from device 402*b*, it can decide to perform various operations with the reservation. For example, device 402*a* may move the reservation to a different location in the superframe, divide the reservation into several parts at different locations in the superframe, or release the reservation (either partly or in whole).

However, if device 402*a* decides to keep DRP reservation 420 (this is likely because the application using the reservation will, in most cases, still be running), device 402*a* will modify the reservation. To do this, device 402*a* will include a new, modified DRP IE in its beacon transmitted in the third superframe. Now, the operation of FIG. 3 is performed to modify DRP reservation 420. As discussed above, if this operation proceeds smoothly, then device 402*a* will barely complete the reservation modification in time during the fifth superframe.

However, if this operation does not proceed smoothly (e.g., there is a conflict in the new, modified DRP IE from device 402*b*'s point of view), then the process of FIG. 3 will fail to accomplish reservation modification before the sixth superframe. Thus, if device 402*a* has not resolved the Relinquish Request IE in the fifth superframe, then device 402*b* is forced to release the MASs indicated in the Relinquish Request IE, possibly causing the whole of reservation 420 being terminated.

VI. Relinquishment Processing

As indicated by the above scenario, when a target device receives a Relinquish Request IE, it has a time span of four superframes in which it must forward the Relinquish Request IE to the owner device and wait for the owner device to react and respond to Relinquish Request IE.

Embodiments of the present invention accelerate such response times through the forwarding of availability information with the Relinquish Request IE. For instance, with reference to WiMedia, the target device of a reservation includes the Relinquish Request IE as well as a DRP Availability IE together in the same beacon(s). Through this technique of the present invention, the chances for the owner of the reservation to successfully modify the existing reservation in the time limit of four superframes are maximized. This is because the likelihood of reservation collision during the modification of the reservation is diminished to as close to zero as possible.

Figure 5:
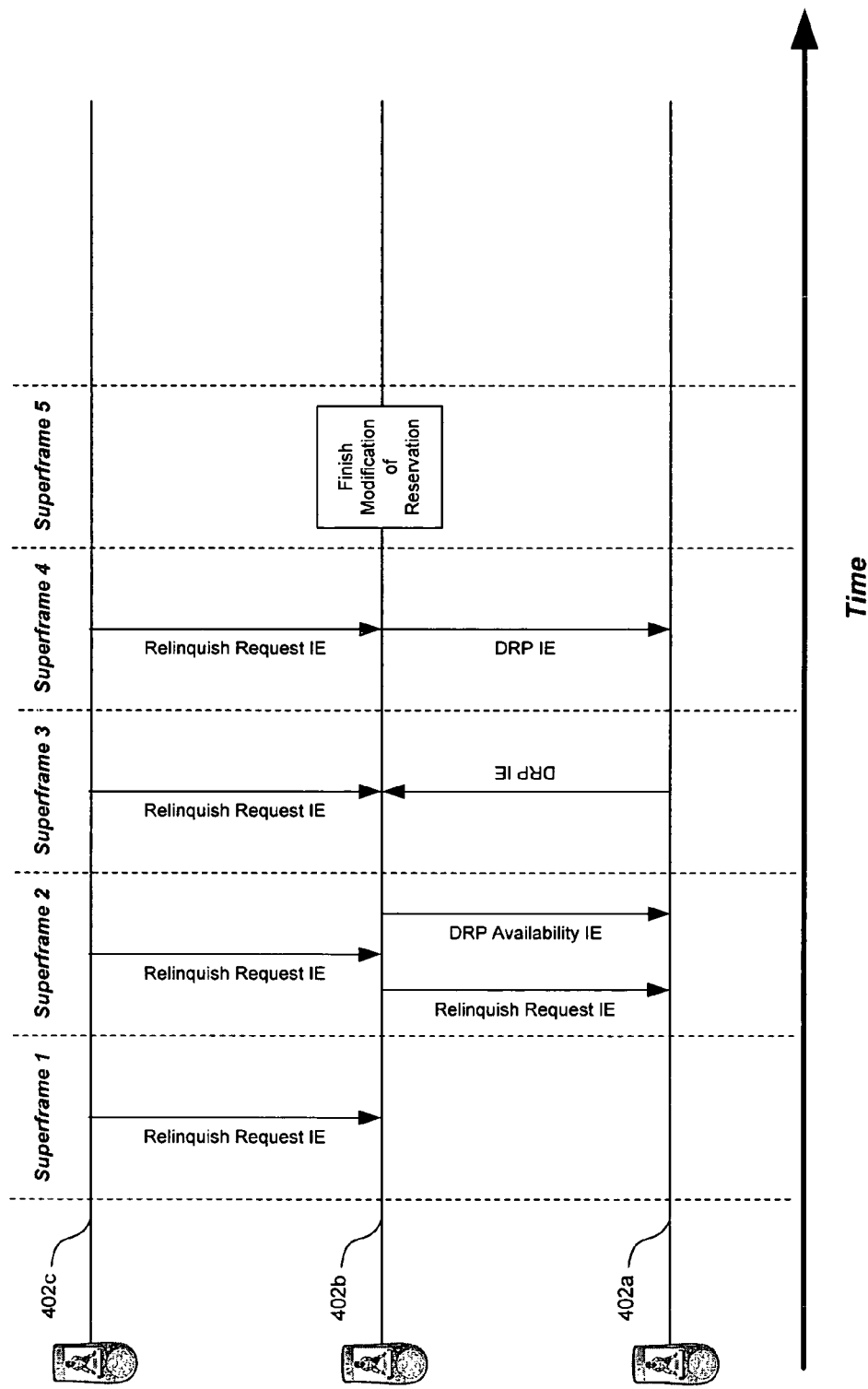
FIG. 5 is a diagram illustrating a sequence of events, according to embodiments of the present invention.

FIG. 5 is a timeline illustrating a relinquishment process, according to embodiments of the present invention. In particular, FIG. 5 provides a superframe-by-superframe account of events. These events are described with reference to the scenario of FIG. 4. However, such events may be performed with other scenarios and network topologies.

Before the occurrence of the events shown in FIG. 5, a pre-existing active reservation exists between devices 402*a* and 402*b*. Also, prior to the events of shown in FIG. 5, device 402*c* has a desire to communicate. However, device 402*c* determines (from received beacon transmissions) that there are no (or insufficient) available wireless resources (e.g., no MASs) for it to communicate. Based on this determination, device 402*c* transmits a beacon in Superframe 1 that contains a Relinquish Request IE. This transmission is shown in FIG. 5. Also, as shown in FIG. 5, device 402*c* will continue to transmit this IE in each successive superframe until its resource availability issues are resolved (e.g., until device 402*b* satisfies the Relinquish Request IE).

Also, in Superframe 1, device 402*b* receives device 402*c*'s beacon containing a Relinquish Request IE. Since device 402*b* is the target of reservation, it shall forward the Relinquish Request and a DRP Availability IE to the owner of the connection (i.e., to device 402*a*). As shown in FIG. 5, this forwarding occurs in Superframe 2.

By receiving the DRP Availability IE (in addition to receiving the Relinquish Request IE), device 402*a* can see all the reservations of which device 402*b* is aware. This way, device 402*a* can select any new MAS that is available not only for itself, but also is available for device 402*b*.

Accordingly, in Superframe 3, device 402*a* includes a new DRP IE in its beacon. This DRP IE identifies free MASs (free for both devices 402*a* and 402*b*) that are selected for the reservation.

Since the new MASs in the new DRP IE are available for device 402*b*, device 402*b* can already accept the new DRP IE in Superframe 4. In Superframe 5, device 402*a* will finish the modification of the reservation.

Finally, in Superframe 6, device 402*b* can reflect the modified reservation in its beacon. Thus, the specified time limit of four superframes required to resolve the Relinquish Request IE has been achieved.

Although not shown in FIG. 5, devices 402*a* and 402*b* will each exchange (send and receive) DRP IEs in each of their beacons during the existence of their reservation. However, these normal DRP IE transmissions are not depicted for the sake of clarity. For instance, FIG. 5 shows device 402*a* transmitting a DRP IE during Superframe 3 containing the "new" reservations (based on the information received from DRP IE that it received in Superframe 2). However, also in Superframe 3, device 402*b* transmits a DRP IE containing its "old" or preexisting reservations. In contrast, FIG. 5 shows device 402*b* sending a DRP IE in Superframe 4 that confirms the "new" reservations.

In accordance with the above techniques, the inventors of the present invention have proposed a change to the WiMedia MAC specification. Based on this proposal Chapter 8.1.10.17 of a subsequent WiMedia MAC specification states "If a reservation target receives a request to relinquish MASs included in the reservation, it shall include in its beacon a DRP Availability IE and a Relinquish Request IE identifying those MASs with the Target DevAddr field set to the DevAddr of the reservation owner." This subsequent specification is O'Conor, Jay; Brown, Ron (ed.), *Distributed Medium Access Control (MAC) for Wireless Networks, WiMedia Technical Specification, Draft* 0.99, Aug. 6, 2005 (also referred to herein as the WiMedia MAC Specification v. 0.99)

Currently, however, this chapter of the WiMedia MAC specification states "If a reservation target receives a request to relinquish MASs included in the reservation, it shall include a Relinquish Request IE identifying those MASs with the Target DevAddr field set to the DevAddr of the reservation owner." However, nothing about including DRP Availability IE is mentioned.

VII. Information Elements

In embodiments of the present invention, various information elements (IEs) are transmitted to carry out the aforementioned techniques. Such IEs include DRP IEs, DRP Availability IEs, and Relinquish Request IEs. These IEs are described below with reference to FIGS. 6-12.

DRP IEs are described with reference to FIGS. 6-8. These IEs are used to negotiate a reservation for certain MASs. In addition, DRP IEs are used to announce the reserved MASs. FIG. 6 is a diagram of a DRP IE format according to the current WiMedia MAC standard. The DRP IE shown in FIG. 6 includes an Element ID field 602, a Length field 604, a DRP Control Field 606, a Target/Owner DevAddr filed 608, and one or more DRP Allocation fields 610.

Fields 602 and 604 identify the IE as a DRP IE and indicate its length. FIG. 7 is a diagram showing the format of DRP Control Field 606. As shown in FIG. 7, this field includes a reserved field 702, an unsafe field 704, a conflict tie-breaker field 706, an owner field 708, a reservation status field 710, a reason code field 712, a stream index field 714, and a reservation type field 716

Unsafe field 704 indicates whether any of the MASs identified in DRP Allocation Fields 610 are considered unsafe because they exceed one or more specified reservation limit(s). Such an indication exists when unsafe field 704 is set to "1".

Owner field 708 is set to "1" if the transmitting device is the owner of the reservation. Otherwise this field is set to "0" when the transmitting device is the target.

Reservation status field 710 indicates the status of the DRP negotiation process. For instance, this field is set to "0" when the corresponding reservation is under negotiation or in conflict. In contrast, this field is set to "1" when the transmitting device is confirming a reservation or maintaining an established reservation.

Reason code field 712 is used by a reservation target. This field indicates whether a DRP reservation request was successful and whether a reservation has been modified. The encoding scheme of this field is provided below in Table 1.

TABLE 1

Reason Code Field Encoding

| Value | Code | Meaning |
|---|---|---|
| 0 | Accepted | The DRP reservation request is successful |
| 1 | Conflict | The DRP reservation request or existing reservation is in conflict with one or more existing DRP reservations |
| 2 | Pending | The DRP reservation request is being processed |
| 3 | Denied | The DRP reservation request is rejected or existing DRP reservation can no longer be accepted |
| 4 | Modified | The DRP reservation is still maintained but has been reduced in size or multiple DRP IEs for the same reservation have been combined |
| 5-7 | Reserved | Reserved |

Stream index field 714 identifies the stream of data to be sent in the reservation. Conflict tie breaker field 706 contains a randomly generated bit value.

Reservation type field 716 indicates the type of reservation. The encoding scheme for this field is provided below in Table 2.

TABLE 2

Reservation Type Field Encoding

| Value | Reservation Type |
|---|---|
| 0 | Alien BP |
| 1 | Hard |
| 2 | Soft |
| 3 | Private |
| 4 | PCA |
| 5-7 | Reserved |

FIG. 8 provides the format of a DRP Allocation field 610. As shown in FIG. 8, a DRP Allocation field 610 includes a Zone Bitmap 802 and a MAS Bitmap 804. Zone Bitmap field 802 identifies particular zones containing reserved MASs. If a bit in the field is set to one, the corresponding zone contains reserved MASs. However, if a bit is set to zero, there are no reserved MASs in the corresponding zone. MAS Bitmap 804 indicates which MASs in the zones identified by Zone Bitmap field 802 are part of the reservation. If a bit in field 804 is set to one, the corresponding MAS within each zone identified by the Zone Bitmap is included.

Figure 9:
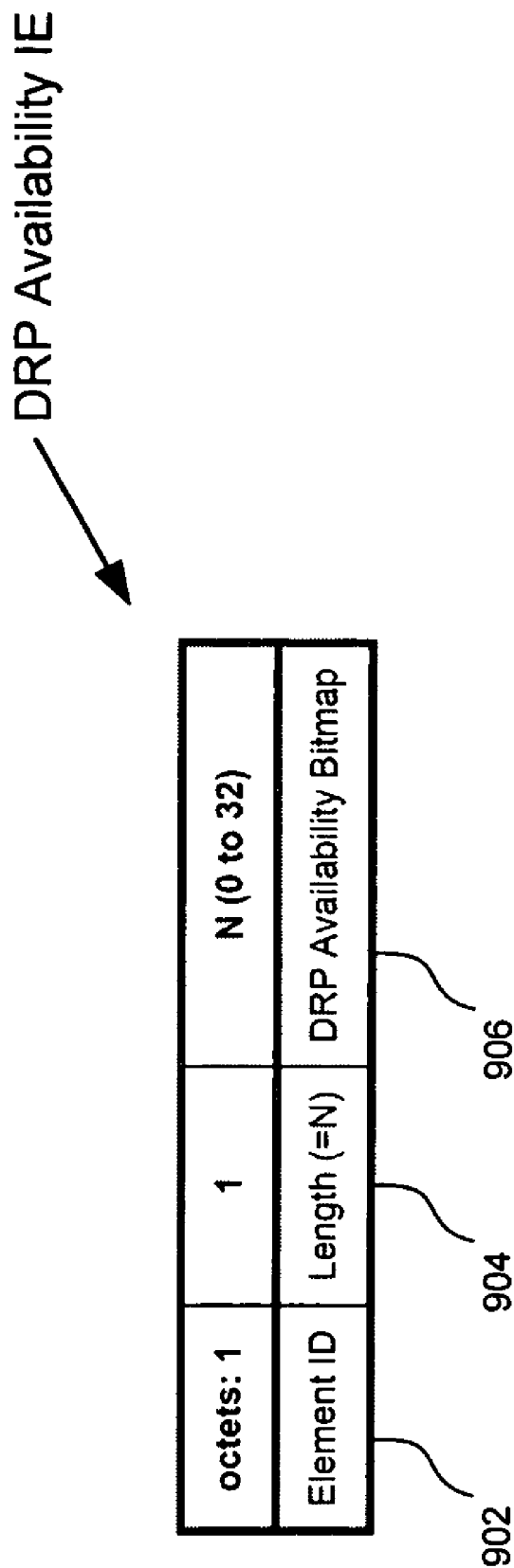

A DRP Availability IE indicates a device's current view of MAS utilization in a superframe, which can be viewed also as the device's ability for accepting new DRP reservations. As shown in FIG. 9, a DRP availability IE according to the current WiMedia MAC standard includes an Element ID field 902, a Length field 904, and a DRP Availability Bitmap field 906.

Fields 902 and 904 identify the IE as a DRP Availability IE and indicate its length. DRP Availability Bitmap field 906 is up to 256 bits long, which would provide one bit for each MAS in the WiMedia superframe. The least significant bit in this field corresponds to the first MAS and successive significant bits correspond to successive MASs. A bit set to "1" indicates that the device is available for DRP reservation in the corresponding MAS. Otherwise, the device is not available for such a reservation.

Figure 10:
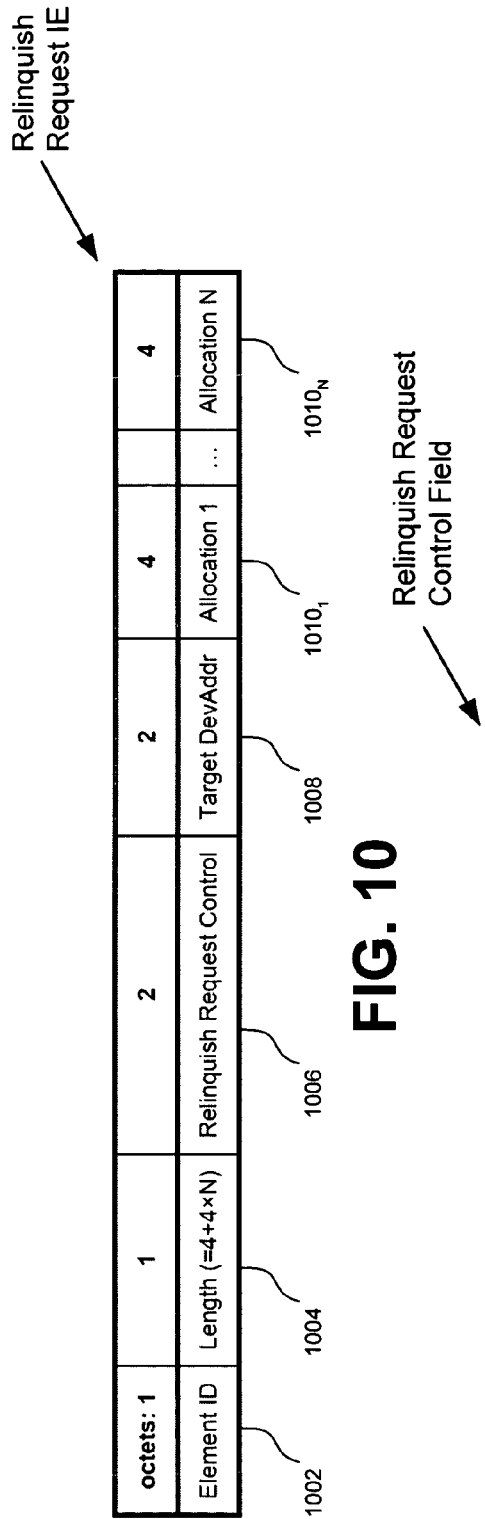

As described above, a Relinquish Request IE requests that a device (a neighbor device) relinquish one or more of MASs from its reservations. The Current WiMedia MAC format for this IE is described with reference to FIGS. 10-12. As shown in FIG. 10, a Relinquish Request IE includes an Element ID field 1002, a Length field 1004, a Relinquish Request Control Field 1006, a Target DevAddr field 1008, and one or more Allocation fields 1010.

Figure 11:
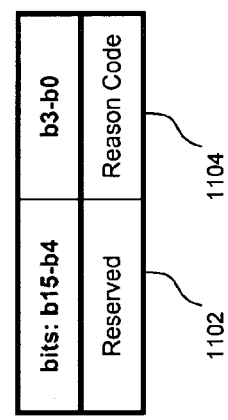

The format of Relinquish Control field 1006 is shown in FIG. 11. As shown in FIG. 11, this field includes a Reserved field 1102, and a Reason Code field 1104. Reason Code field 1104 indicates the reason for the relinquish request. Its encoding according to the current WiMedia MAC Specification is provided below in Table 3.

TABLE 3

Reason Code Field Encoding

| Value | Code | Meaning |
|---|---|---|
| 0 | Non-specific | No reason specified. |
| 1 | Latency | The requested MASs are needed for an application to meet latency requirements. |
| 2 | Block | The requested MASs are needed for an application to meet reservation block-size requirements. |

TABLE 3-continued

Reason Code Field Encoding

| Value | Code | Meaning |
|---|---|---|
| 3 | Over-allocation | The target device holds more MASs than permitted by policy. |
| 4-16 | Reserved | Reserved |

Figure 12:
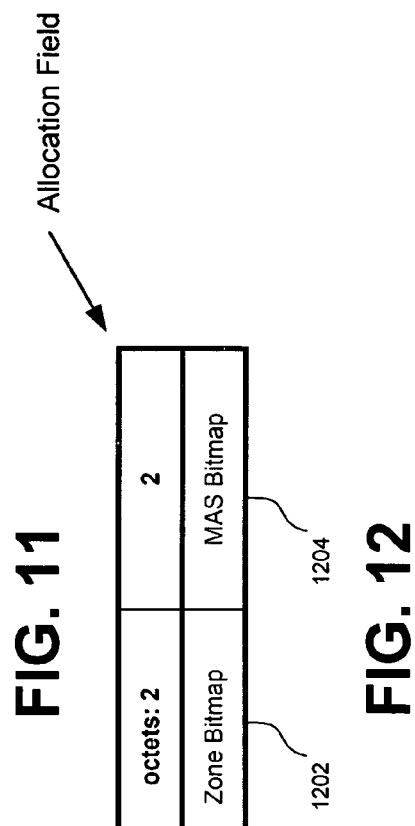

The format of one Allocation field 1010 is shown in FIG. 12. This field includes a Zone Bitmap 1202 and a MAS bitmap 1204. Zone Bitmap field 1202 identifies particular zones containing reserved MASs. If a bit in the field is set to one, the corresponding zone contains reserved MASs, where a zero bit corresponds to no reserved MASs in that zone. MAS Bitmap 1204 indicates which MASs in the zones identified by Zone Bitmap field 1202 are to be relinquished. If a bit in field 1204 is set to one, the corresponding MAS within each zone identified by the Zone Bitmap is included.

VIII. Operation

Figure 13:
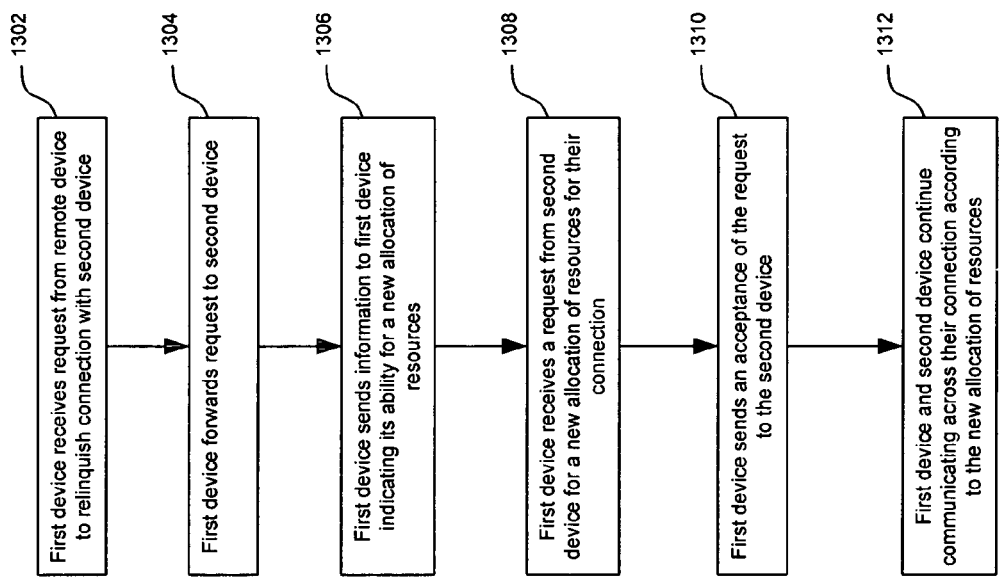
FIG. 13 is a flowchart of an operation, according to embodiments of the present invention.

FIG. 13 is a flowchart of an operation according to aspects of the present invention. This operation involves a first device having a connection with a second device across a wireless communications network, such as one or more WiMedia beaconing group(s). Accordingly, this connection may be a DRP reservation. Moreover, the first device may be the target of the reservation, while the second device is the owner of the reservation. Thus, the reservation may have been initiated by the second device. This initiation may have occurred according to the technique described in connection with FIG. 3.

In a step 1302, the first device receives a request from a remote device to relinquish a connection between the first device and the second device. This connection has a particular allocation of resources (e.g., one or more WiMedia MASs). In embodiments involving WiMedia, this request is a Relinquish Request IE. This request may have been transmitted because the remote device wishes to establish a connection and the first device possesses an over allocation-of network resources (e.g., MAS slots).

Upon receipt of this request the first device forwards the request (e.g., a Relinquish Request IE) to the second device in a step 1304. Also, in a step 1306, the first device sends information to the second device indicating its current view of utilization of resources of the wireless communications network. In the context of WiMedia, this information may be in the form of a DRP Availability IE. Moreover, in such embodiments, steps 1304 and 1306 may comprise sending the Relinquish Request IE and the DRP Availability IE in a single beacon transmission.

A step 1308 follows steps 1304 and 1306. In this step, the first device receives a request from the second device for a new allocation of network resources for their connection. This new allocation of resources is different from the current allocation of resources.

Upon receipt of this request, the first device determines whether it wants to continue the connection with the new allocation of resources. If so, then the first device sends an acceptance of the request in a step 1310. In the context of WiMedia, this acceptance may be a DRP IE including the respective allocation of resources. Following step 1310, the first and second devices continue communicating across the connection according to the new allocation of resources in a step 1312.

IX. Wireless Communications Device

Figure 14:
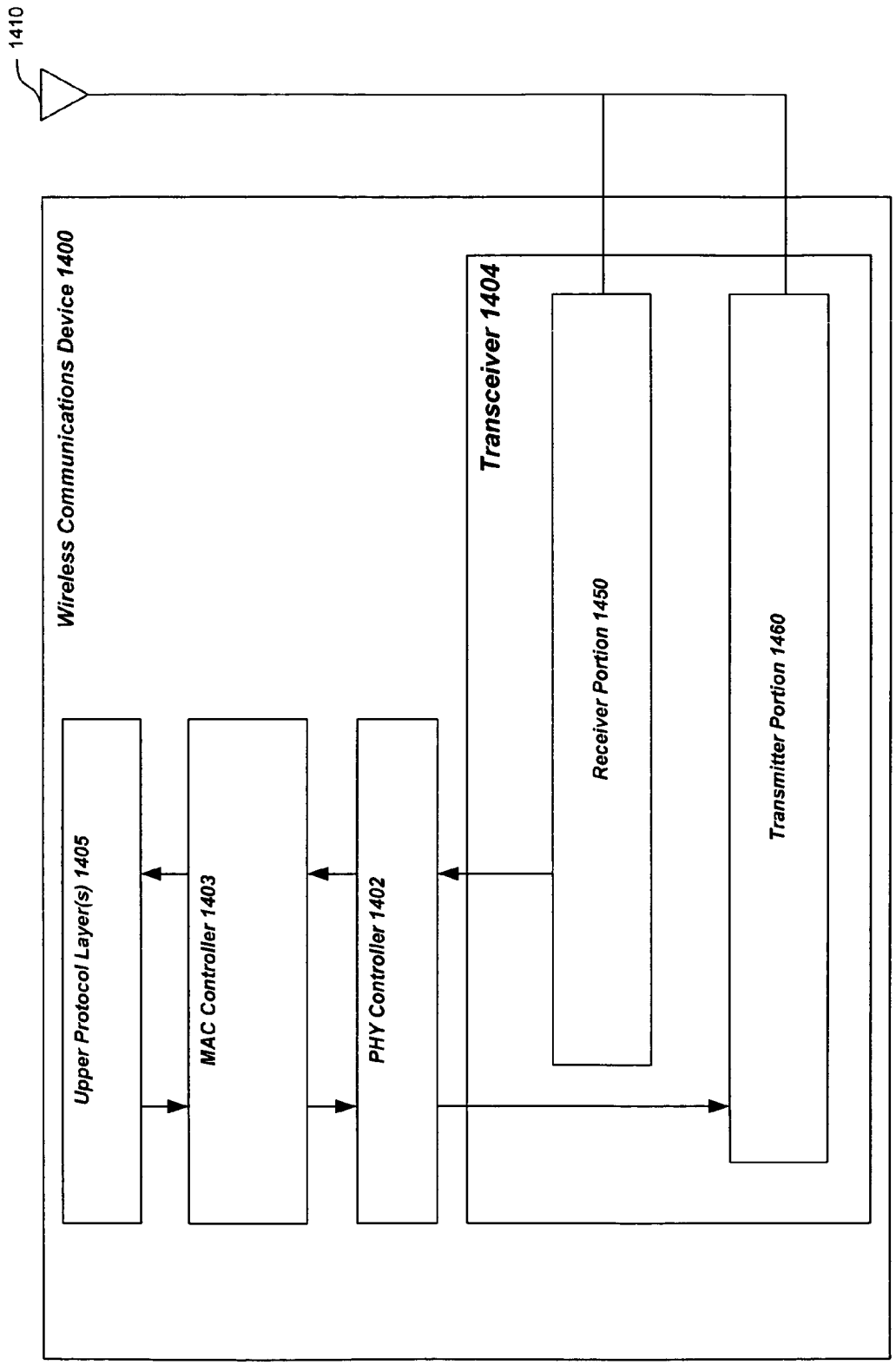
FIG. 14 is a diagram of a device architecture, according to embodiments of the present invention.

FIG. 14 is a diagram of an exemplary wireless communications device 1400, according to embodiments of the present invention. This device may operate according to the techniques of the present invention. This device may be used in various communications environments, such as the environment of FIG. 1. As shown in FIG. 14, device 1400 includes a physical layer (PHY) controller 1402, a media access controller (MAC) 1403, transceiver 1404, upper protocol layer(s) 1405, and an antenna 1410.

MAC controller 1403 generates frames (data transmissions) and beacons for wireless transmission. In addition, MAC controller 1403 receives and processes frames and beacon transmissions that are originated from remote devices. MAC controller 1403 exchanges these frames and beacon transmissions with PHY controller 1402. In turn, PHY controller 1402 exchanges frames and beacon transmissions with transceiver 1404. Moreover, in embodiments employing WiMedia, MAC controller 1403 performs operations involving the exchange of IEs. For instance, MAC controller 1403 is responsible for the processing and generation of IEs, as well as DRP negotiations.

FIG. 14 shows that transceiver 1404 includes a receiver portion 1450 and a transmitter portion 1460. In embodiments of the present invention, transceiver 1404 may transmit and receive OFDM signals. Accordingly, in such embodiments, transmitter portion 1460 may include components, such as an inverse fast fourier transform (IFFT) module, a zero padding module, an upconverter, and a transmit amplifier. To receive OFDM signals, receiver portion 1450 may include components, such as a downconverter, a receive amplifier, and a fast fourier transform (FFT) module.

As shown in FIG. 14, device 1400 further includes one or more upper protocol layers 1405. These layers may involve, for example, user applications. Accordingly, upper layers 1405 may exchange information with remote devices. This involves layer(s) 1405 exchanging protocol data units with MAC controller 1403. In turn, MAC controller 1403 operates with PHY controller 1402 and transceiver 1404 to transmit and receive corresponding wireless signals.

The device of FIG. 14 may be implemented in hardware, software, firmware, or any combination thereof. For instance, the components of portions 1450 and 1460 may include electronics, such as amplifiers, mixers, and filters. Moreover, implementations of device 1400 may include digital signal processor(s) (DSPs) to implement various modules, such as components of receiver portion 1450 and transmitter portion 1460. Moreover, in embodiments of the present invention, processor(s), such as microprocessors, executing instructions (i.e., software) that are stored in memory (not shown) may be used to control the operation of various components in device 1400. For instance, components, such as PHY controller 1402 and MAC controller 1403, may be primarily implemented through software operating on one or more processors.

Figure 15:
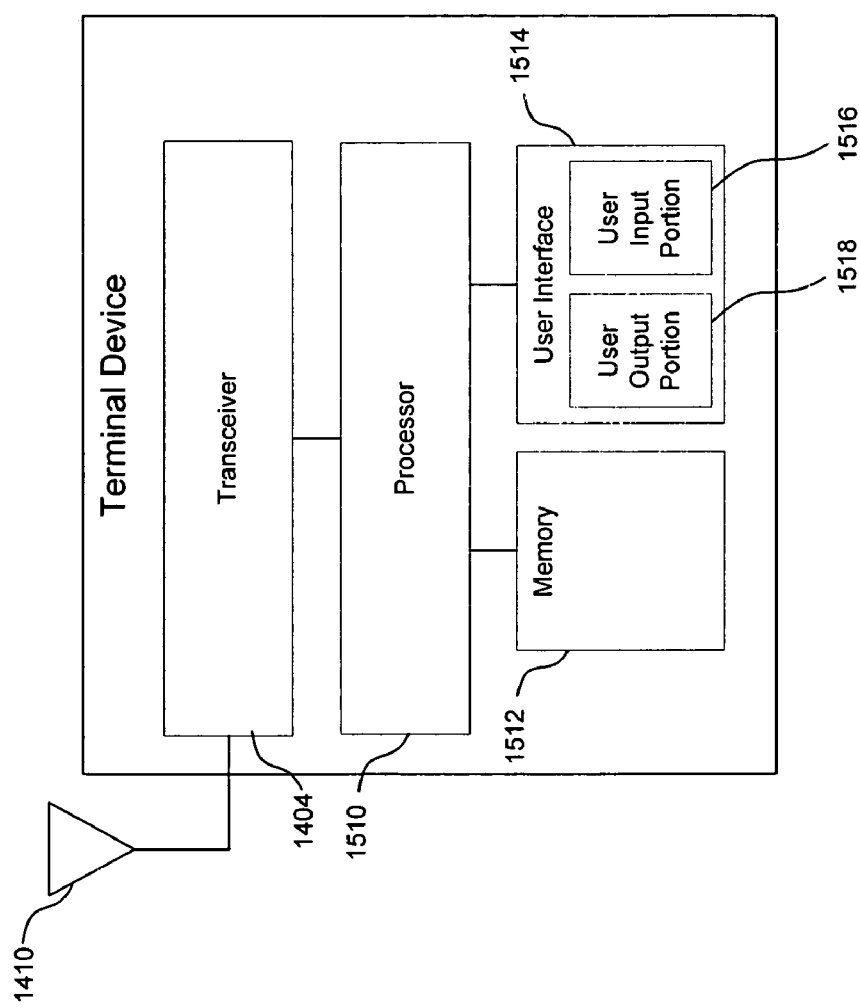
FIG. 15 is a diagram of a wireless communications device implementation, according to embodiments of the present invention.

One such implementation of the FIG. 14 architecture, according to an embodiment of the present invention, is shown in FIG. 15. This diagram illustrates the terminal device implemented according to one embodiment of the present invention. As shown in FIG. 15, this implementation includes a processor 1510, a memory 1512, and a user interface 1514. In addition, the implementation of FIG. 15 includes transceiver 1404 and antenna 1410. These components may be implemented as described above with reference to FIG. 14. However, the implementation of FIG. 15 may be modified to include different transceivers that support other wireless technologies.

Processor 1510 controls device operation. As shown in FIG. 15, processor 1510 is coupled to transceiver 1404. Processor 1510 may be implemented with one or more microprocessors that are each capable of executing software instructions stored in memory 1512, for example, as a computer system.

Memory 1512 includes random access memory (RAM), read only memory (ROM), and/or flash memory, and stores information in the form of data and software components (also referred to herein as modules). These software components include instructions that can be executed by processor 1510. Various types of software components may be stored in memory 1512. For instance, memory 1512 may store software components that control the operation of transceiver 1404. Also, memory 1512 may store software components that provide for the functionality of PHY controller 1402, MAC controller 1403, and upper protocol layer(s) 1405.

Moreover, memory 1512 may store software components that control the exchange of information through user interface 1514. As shown in FIG. 15, user interface 1514 is also coupled to processor 1510. User interface 1514 facilitates the exchange of information with a user. FIG. 15 shows that user interface 1514 includes a user input portion 1516 and a user output portion 1518.

User input portion 1516 may include one or more devices that allow a user to input information. Examples of such devices include keypads, touch screens, and microphones. User output portion 1518 allows a user to receive information from the device. Thus, user output portion 1518 may include various devices, such as a display, and one or more audio speakers (e.g., stereo speakers) and a audio processor and/or amplifier to drive the speakers. Exemplary displays include color liquid crystal displays (LCDs), and color video displays.

The elements shown in FIG. 15 may be coupled according to various techniques. One such technique involves coupling transceiver 1404, processor 1510, memory 1512, and user interface 1514 through one or more bus interfaces. In addition, each of these components is coupled to a power source, such as a removable and/or rechargeable battery pack (not shown).

X. Conclusion

While various embodiments of the present invention have been described above, it should be understood that they have been presented by way of example only, and not in limitation. For instance, the features described herein may be employed in networks other than WiMedia networks.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   (a) receiving at a first device, a request from a remote device to relinquish at least a portion of an existing reservation between the first device and a second device in a wireless communications network, the reservation initiated by the second device and comprising a first allocation of resources of the wireless communications network;
   (b) forwarding the request from the first device to the second device; and
   (c) sending from the first device to the second device information accompanying the request indicating a current view of resource utilization in the wireless communications network, the current view from a perspective of the first device, wherein devices belonging to the wireless communications network including the first device, second device and the remote device have a shared responsibility for maintaining configuration of the network by transmitting and receiving beacon transmissions within the wireless communications network.

2. The method of claim 1, further comprising:
   (d) receiving at the first device a second request from the second device indicating a second allocation of resources of the wireless communications network between the first device and the second device, wherein the second allocation of resources is based on the information provided by the first device in step (c); and
   (e) sending from the first device to the second device an acceptance of the request received in step (d).

3. The method of claim 2, wherein steps (a) through (e) are performed when the first device has an allocation of resources that exceeds one or more predetermined limits for the wireless communications network.

4. The method of claim 3, wherein the one or more predetermined limits includes at least one of a total allocation of resources limit and a total consecutive time slot allocation limit for the reservation.

5. The method of claim 2, further comprising communicating with the second device across the reservation according to the second allocation of resources.

6. The method of claim 1, wherein the remote device is unable to communicate with the second device across the wireless communications network directly.

7. The method of claim 2:
   wherein the resources of the wireless communications network include a plurality of time slots occurring in a repeating time interval;
   wherein step (a) is performed in a first occurrence of the repeating time interval, steps (b) and (c) are performed in a second occurrence of the repeating time interval, step (d) is performed in a third occurrence of the repeating time interval, and step (e) is performed in a fourth occurrence of the repeating time interval; and
   wherein the first, second, third, and fourth occurrences happen consecutively.

8. The method of claim 7, wherein the time intervals are WiMedia superframes.

9. The method of claim 1, wherein step (b) and (c) are performed through a single transmission.

10. The method of claim 1, wherein the wireless communications network is a WiMedia network, and the reservation between the first and second devices is a Distributed Reservation Protocol (DRP) reservation.

11. The method of claim 10:
    wherein step (b) comprises sending a Relinquish Request Information Element (IE), and step (c) comprises sending a DRP Availability IE; and
    wherein the Relinquish Request IE and the DRP Availability IE are sent in a single beacon transmission.

12. The method of claim 11, wherein step (a) comprises receiving the Relinquish Request IE.

13. The method of claim 1, wherein, upon performance of step (a), the first device has an allocation of resources that exceeds one or more predetermined limits for the wireless communications network.

14. The method of claim 1, wherein the request received in step (a) indicates the first device having an allocation of resources that exceeds one or more predetermined limits for the wireless communications network.

15. An apparatus, comprising:
a transceiver for communicating with devices across a wireless communications network;
a memory;
a processor that executes instructions stored in the memory for:
(a) receiving, through the transceiver, a request from a remote device to relinquish at least a portion of an existing reservation between the apparatus and a second device in a wireless communications network, the reservation initiated by the second device and comprising a first allocation of resources of the wireless communications network;
(b) forwarding, through the transceiver, the request to the second device; and
(c) sending, through the transceiver, information accompanying the request to the second device, the information indicating a current view of resource utilization in the wireless communications network, the current view from a perspective of the apparatus;
wherein devices belonging to the wireless communications network including the apparatus, second device and the remote device have a shared responsibility for maintaining configuration of the network by transmitting and receiving beacon transmissions within the wireless communications network.

16. The apparatus of claim 15, wherein the processor executes further instructions stored in the memory for:
(d) receiving, through the transceiver, a second request from the second device indicating a second allocation of resources of the wireless communications network between the first device and the second device, the second allocation of resources different from the first allocation of resources; and
(e) sending, through the transceiver, an acceptance of the request received in step (d) to the second device.

17. The apparatus of claim 15, wherein the request from the remote device to relinquish the at least a portion of the reservation indicates the apparatus has a total allocation of network resources that exceeds a predetermined limit for the wireless communications network.

18. The apparatus of claim 15, wherein the wireless communications network is a WiMedia network, and the reservation between the apparatus and the second device is a Distributed Reservation Protocol (DRP) reservation.

19. The apparatus of claim 15, wherein the resources of the wireless communications network include a plurality of time slots occurring in a repeating time interval.

20. The apparatus of claim 19, wherein the repeating time interval is a WiMedia superframe.

21. The apparatus of claim 15, wherein the remote device is unable to communicate with the second device across the wireless communications network directly.

22. A computer program product comprising a non-transitory computer useable medium having computer program logic recorded thereon for enabling a processor in a device, the computer program logic comprising:
program code for enabling the processor to cause the device to receive a request from a remote device to relinquish at least a portion of an existing reservation between the device and a second device in a wireless communications network, the reservation initiated by the second device and comprising a first allocation of resources of the wireless communications network;
program code for enabling the processor to cause the device to forward the request to the second device; and
program code for enabling the processor to cause the device to send to the second device information accompanying the request indicating a current view of resource utilization in the wireless communications network, the current view from a perspective of the device;
wherein devices belonging to the wireless communications network including the device, second device and the remote device have a shared responsibility for maintaining configuration of the network by transmitting and receiving beacon transmissions within the wireless communications network.

23. The computer program product of claim 22, wherein the computer program logic further comprises:
program code for enabling the processor to cause the device to receive a request from the second device for a second allocation of resources of the wireless communications network between the device and the second device, wherein the second allocation of resources is based on the information indicating a current view of resource utilization in the wireless communications network;
program code for enabling the processor to cause the device to send to the second device an acceptance of the request received from the second device.

24. The computer program product of claim 22, wherein the wireless communications network is a WiMedia network.

25. A method, comprising:
(a) receiving at a first device, a Relinquish Request Information Element (IE) from a remote device indicating a request for relinquishing at least a portion of an existing reservation between the first device and a second device in a wireless communications network, the reservation initiated by the second device and comprising a first allocation of resources of the wireless communications network made according to a Distributed Reservation Protocol (DRP);
(b) forwarding the Relinquish Request IE from the first device to the second device; and
(c) sending from the first device to the second device a DRP Availability IE accompanying the request indicating a current view of resource utilization in the wireless communications network, the current view from a perspective of the first device;
wherein devices belonging to the wireless communications network including the first device, second device and the remote device have a shared responsibility for maintaining configuration of the network by transmitting and receiving beacon transmissions within the wireless communications network.

26. An apparatus, comprising:
a transceiver in a first device for communicating with devices across a wireless communications network;
a memory;
a processor that executes instructions stored in the memory for:
(a) receiving at the first device, a Relinquish Request Information Element (IQ from a remote device indicating a request for relinquishing at least a portion of an existing reservation between the first device and a second device in a wireless communications network, the reservation initiated by the second device and comprising a first allocation of resources of the wireless communications network made according to a Distributed Reservation Protocol (DRP);

(b) forwarding the Relinquish Request IE from the first device to the second device; and (c) sending from the first device to the second device a DRP Availability IE accompanying the request indicating a current view of resource utilization in the wireless communications network, the current view from a perspective of the first device;

wherein devices belonging to the wireless communications network including the first device, second device and the remote device have a shared responsibility for maintaining configuration of the network by transmitting and receiving beacon transmissions within the wireless communications network.

27. A computer program product comprising a non-transitory computer useable medium having computer program logic recorded thereon for enabling a processor in a communications device, the computer program logic comprising:

program code for enabling the processor to cause the device to receive, a Relinquish Request Information Element (IE) from a remote device indicating a request for relinquishing at least a portion of an existing reservation between the device and a second device in a wireless communications network, the reservation initiated by the second device and comprising a first allocation of resources of the wireless communications network using to a Distributed Reservation Protocol (DRP);

program code for enabling the processor to cause the device to forward the Relinquish Request IE from the device to the second device; and program code for enabling the processor to cause the device to send to the second device a DRP Availability IE accompanying the request indicating a current view of resource utilization in the wireless communications network, the current view from a perspective of the device;

wherein devices belonging to the wireless communications network including the device, second device and the remote device have a shared responsibility for maintaining configuration of the network by transmitting and receiving beacon transmissions within the wireless communications network.

\* \* \* \* \*